Patented Oct. 21, 1947

2,429,219

UNITED STATES PATENT OFFICE 2,429,219

PROCESS OF MAKING LINEAR SUPERPOLYESTERS

John C. Cowan, Peoria, Ill., and Donald H. Wheeler, Minneapolis, Minn., assignors to United States of America, as represented by the Secretary of Agriculture No Drawing. Application March 7, 1944, Serial No. 525,464

6 Claims. (Cl. 260—410.6)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United State of America for governmental purposes without the payment to us of any royalty thereon.

This invention relates to high molecular weight dihydric alcohol polyesters of dimeric, dibasic fat acids derived from heat-bodied vegetable oils containing a plurality of double bonds, and to their production. These esters are essentially linear, superpolyesters and are useful as base materials in the preparation of elastic compositions. They are obtained in general by treating the unsaturated, dimeric, dibasic fat acids or the esters thereof with dihydric alcohols.

It is known that desirable properties may be imparted to unsaturated vegetable oils and products containing such oils by heat-bodying. In an inert atmosphere, thermal treatment of unsaturated oils, their simple esters or other derivatives, effects a dimerization and trimerization of the unsaturated fat acid radicals.

In general, fat acids, in which the acyl radical contains more than one double bond, are capable of undergoing polymerization by such thermal treatment. For example, when methyl linoleate is heated at from 285° to 300° C., both the methyl ester of dimeric linoleic acid and the methyl ester of trimeric linoleic acid are formed together with small amounts of other products. These esters are, respectively, the methyl ester of a dibasic acid having a molecular weight of 560, being twice that of methyl linoleate, and of a tribasic acid having a molecular weight of 840, being three times that of the linoleate. Their structures are not known with certainty.

In large-scale equipment, it is possible to obtain mixtures of dimeric and trimeric fat acids or their esters from the unsaturated oils by a number of methods. One method is as follows: The unsaturated oil is converted to methyl esters of the fat acids by alcoholysis of the oil glycerides with methyl alcohol. The methyl esters are separated from the reaction mass and are heat-polymerized at 300° C. for 16 to 20 hours. Any unpolymerized methyl esters are removed by vacuum distillation, leaving a residue comprising a mixture of the methyl esters of the dimeric and of the trimeric fat acids. Vegetable oils, such as corn oil, soy bean oil, cottonseed oil, tung oil, Perilla oil, linseed oil, and dehydrated castor oil, will give a mixture of dimeric and trimeric fat acid esters when treated in the above manner. In general, oils containing acids which have a plurality of double bonds are suitable starting materials for these polymeric fat acids.

The residual mixture above obtained may be separated into dimeric fat acid ester and trimeric fat acid ester fractions by fractionation in a molecular still. If a cyclic molecular still is used, a very narrow fraction of the dimeric fat acid ester can be obtained which is relatively free of the trimeric fat acid ester and is a suitable starting material for the preparation of the superpolyesters of this invention. However, second or third fractionation gives materials which are freer of the trimeric fat acid ester and are preferred.

Substantially pure dimeric, dibasic fat acids can then be obtained from the dimeric fat ester fraction, if desired, by saponification and neutralization.

We have found that the dimeric dibasic fat acids substantially free of trimeric fat acids obtained in the manner above indicated may be reacted with dihydric alcohols to give essentially linear superpolyesters. These superpolyesters are novel in that they contain non-benzenoid unsaturation.

The terminology used herein to designate molecular weight ranges of a condensation polymer is that suggested by Carothers (J. Am. Chem. Soc., vol. 54, page 1559 (1932)), namely, alpha-polymers, 800 to 5 000; gamma-polymers, 5,000 to 10,000; and superpolymers, above 10,000.

In general, the superpolyesters in accordance with this invention may be made by reacting the dimeric, dibasic fat acids with such dihydric alcohols as ethylene glycol, tetraethylene glycol, decamethylene glycol, and hydrogenated dimeric fat glycols. The methyl esters of the dimeric fat acids may be employed, if a glycolysis catalyst, such as p-toluene sulfonic acid, the zinc salt of dimeric fat acid, and so forth, is also used. It is particularly advantageous to effect the polyesterification in an inert atmosphere, such as hydrogen, nitrogen, or carbon dioxide. Efficient stirring and rapid circulation of inert gas through or over the reaction mixture aids in the formation of the superpolyesters.

It is ordinarily advantageous to use equivalent amounts of the dimeric fat acids or esters and the glycol. However, with ethylene glycol, we have found that it is more advantageous to use a 15 percent to 20 percent excess of the equivalent amount of glycol, and to effect the formation of the superpolyesters by glycolysis of the alpha-polyester thus formed. The use of a considerable excess of glycol will give polymers similar to III of the following formula:

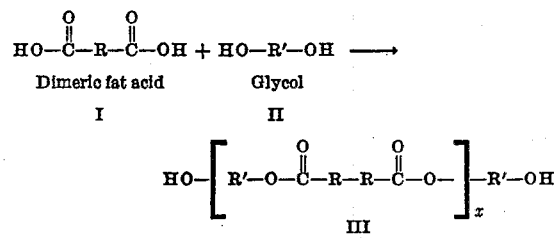

where the numeral represented by $x$ will average 3 to 5, and will ordinarily not exceed 10. By heating this alpha-polyester under suitable conditions with a glycolysis catalyst, superpolyesters are obtained. This method is particularly useful where glycols readily volatilize from the reaction or may tend to decompose at temperatures of 175° to 225° C.

The method of this invention can be used to obtain not only superpolyesters from these dibasic fat acids by reacting them with glycols, but also to obtain superpolyamides by reacting these dibasic fat acids with diamines.

The superpolyesters from the dimeric, dibasic fat acids obtained according to the invention can serve as suitable replacement for natural rubber in most, if not all, of its uses. They can be compounded with sulfur, carbon black, accelerators, accelerator activators, and other ingredients used in rubber compounding. Upon proper heat treatment and vulcanization, materials having high tensile strength and elongation are obtained. For certain purposes these vulcanized polyesters are superior to the compounded and vulcanized natural rubber.

The linear nature and the high molecular weight of the polyesters described in this application were established by the use of Flory's principle (J. Am. Chem. Soc. 62:1057 (1940)) that the logarithm viscosity of a molten polyester is proportional to the square root of the weight average molecular weight.

The following examples are illustrative of the invention and the manner in which it may be practiced:

Example I

A mixture of 33.8 grams (0.121 equivalent) of dimeric fat acids obtained from corn oil, 4.86 grams (0.157 equivalent) of ethylene glycol (30.5 percent excess), and 15 milligrams of p-toluene sulfonic acid was heated at 175° to 180° C. for 8 to 10 hours, and then at 195° C. for 17 days. Purified nitrogen was passed through the reaction mixture, and it was stirred at 300 R. P. M. with an efficient stirrer throughout the reaction period.

At the end of this period, the resulting superpolyester had a viscosity of 4,600 poises at 195° C., which corresponds to a molecular weight of approximately 24,000. This molecular weight was estimated by determining the relation between the log of viscosity and the square root of the molecular weight, as determined by end-group titration for lower molecular weight polyesters where equivalent quantities of dibasic acid and glycol were used. The superpolyester was soluble in chloroform, and it was an elastic, non-crystalline solid. It remained elastic and non-brittle when cooled to −50° C.

Example II

A mixture of 31.27 grams (0.115 equivalent) of dimeric fat acids obtained from soybean oil, 9.72 grams (0.116 equivalent) of decamethylene glycol, and 0.25 percent of zinc salt of dimeric fat acids, was heated at 225° C. for 15 hours with vigorous stirring. Rapid circulation of nitrogen gas was maintained through the mixture after the initial reaction had subsided.

The resulting superpolyester had an estimated molecular weight of 20,000. It was soluble in chloroform, and it gave a rubberlike product on treatment with vulcanizing agents.

Example III

A mixture of 42.1 grams (0.151 equivalent) of dimeric fat acids from tung oil and 14.75 grams (0.152 equivalent) of tetraethylene glycol was heated for 534 hours at 195°±2° C. Nitrogen was passed slowly through the reaction mixture during this period.

The following table shows the change in viscosity with the molecular weight as indicated by neutral equivalent obtained by titration of end-group carboxylic acid, as found in samples removed from the reaction mixture at different times during the reaction period.

| Viscosity in Poises (at 194° C.) | Molecular Weight |
|---|---|
| [1] 2.06 | 6,720 |
| 2.92 | 8,570 |
| 3.95 | 10,250 |
| 5.55 | 11,875 |
| 6.49 | 12,890 |
| 87.5 | 24,900 |

[1] 190° C.

The resulting superpolyester was readily soluble in chloroform.

Example IV

A mixture of 5.6 pounds of methyl esters of dimeric fat acid from dehydrated castor oil, 0.9 pound of ethylene glycol, and 0.25 percent zinc salt of dimeric fat acid, was heated at 180° to 185° C. for four hours with vigorous stirring. The reaction temperature was then raised to 210° C. and carbon dioxide passed through the reaction mixture for ten hours, following which the pressure was reduced to 10 mm. of mercury and so maintained for five hours.

The resulting product had a viscosity indicating a molecular weight of 15,000. It was completely soluble in chloroform.

Example V

A mixture of 14.6 grams of adipic acid, 56.0 grams of dimeric fat acid from safflower oil, and 23.6 grams of hexamethylene glycol was heated at 175° C. for two hours under a nitrogen atmosphere with vigorous stirring. A 0.25 percent portion of zinc salt of dimeric fat acid was then added, and the temperature raised to 210° C. and so maintained for 18 hours while passing nitrogen through the reaction mixture. The pressure was then reduced to 5 mm. of mercury and the heating continued for 10 hours.

The resulting product had a neutral equivalent showing a molecular weight of 16,000 and was soluble in chloroform.

Example VI

A mixture of 16.8 grams of citraconic anhydride, 84.0 grams of dimeric fat acid from corn oil, 58.2 grams of tetraethylene glycol, and 0.5 gram of zinc salt of dimeric fat acid was heated at 135° C. for about one hour. The temperature was then slowly raised to 195° C. and so maintained for 48 hours. Nitrogen was passed through the reaction mixture during the last 36 hours.

Correlation of viscosity with neutral equivalent indicated a molecular weight of 11,000 for the final product.

Example VII

A mixture of 43.2 grams of dimeric fat acid derived from soybean oil and 4.94 grams of ethylene diamine was heated at 193° C. for 35 hours with nitrogen gas bubbling through the reaction mixture.

A polyamide melting at 112° to 116° C., having an approximate molecular weight of 10,500 and soluble in chloroform was obtained.

Superpolymers may also be prepared using the unsaturated dimeric fat glycol obtained by sodium reduction of the esters of dimeric fat acid, or the relatively saturated dimeric fat glycol obtained by catalytic reduction with copper chromium oxide.

The superpolyesters obtained according to this invention can be converted into rubberlike materials having high tensile strength and elongation. These rubberlike materials have unusual aging characteristics and are very resistant to breakdown by ozone and oxygen.

The polyesters when heated with a small amount of sulfur (1–3 percent) are converted to a millable product, which may be handled in a manner similar to that used with natural and synthetic rubbers to obtain a vulcanized product. The manner of performing this conversion, in the case of polyesters obtained from glycols and polymeric fat acids (containing both dimeric and trimeric fat acids), is disclosed in application for patent, Serial No. 464,787, filed November 6, 1942. Similar procedures may be employed with the superpolyesters of this invention, as exhibited by the following illustrations:

Illustration 1

The superpolyester (100 parts) obtained in Example I was mixed with 80 parts of furnace black, 5.0 parts of sulfur, 6 parts of zinc oxide, 2 parts of mercaptobenzothiazole, 1 part of antioxidant resin, and 0.15 part of tetramethylthiuram disulfide, and this mixture was baked at 150° C. for 30 minutes, cooled, milled into a sheet, and then cured in a mold at 140° C. for 30 minutes.

The vulcanizate thus obtained had a tensile strength of 2,200 pounds per square inch at an ultimate elongation of 550 percent, as compared to a polyester made from polymeric fat acids, in which no separation of the dimeric from the trimeric fat acid was made, which had a tensile strength of 500 to 800 pounds per square inch and an ultimate elongation of 150 percent to 250 percent.

Illustration 2

The superpolyester from one equivalent of adipic acid, four equivalents of dimeric fat acid derived from dehydrated castor oil, and an excess of ethylene glycol when treated as in Illustration I gave a vulcanizate having a tensile strength of 1,600 pounds per square inch at an ultimate elongation of 450 percent. Similarly, a superpolyester obtained from one equivalent of sebacic acid, and four equivalents of dimeric fat acid derived from isomerized linseed oil and an excess of ethylene glycol gave a vulcanizate having a tensile strength and elongation of 2,100 pounds per square inch and 400 percent, respectively.

The superpolyesters of this invention are also useful for addition to certain oils derived from petroleum for increasing the viscosity index and improving the lubricating qualities of these oils.

In general, linear superpolymers can be obtained from difunctional molecules such as dibasic acids, dihydric alcohols, diamines, etc., which have additional functionality present in the form of non-benzenoid unsaturation.

However, there are certain limitations. The conditions of the reaction must effect the formation of superpolymers without causing the unsaturation to become functional. It is essential to maintain an inert atmosphere and to effect the reaction at a temperature which is lower than that temperature at which the unsaturation becomes functional. Many unsaturated compounds such as citraconic acid and maleic anhydride are ordinarily considered to be thermally functional. However, we have been able to prepare essentially linear superpolyesters using citraconic anhydride as one of the reactants. In this preparation, it was necessary to use pure nitrogen as an inert atmosphere and to remove all dissolved gases before heating to polyesterification temperature.

The temperature at which the unsaturation becomes functional can be determined by preparing an alpha- or gamma-polyester in an inert atmosphere without catalyst and heating the polyester at different temperatures for an extended period to determine if gelation occurs. Once it is determined what temperature range does effect gelation, the superpolyester or superpolymer may be prepared at temperatures below this range. If this temperature is too low, a superpolymer will not be formed in a reasonable length of time.

Having thus described the invention, what is claimed is:

1. A process of forming an essentially linear superpolyester containing non-benzenoid unsaturation, comprising reacting a dihydric alcohol with a material selected from the group consisting of the dimeric, dibasic fat acids and their esters, said material being derived from heat-bodied vegetable oils containing acids having a plurality of double bonds.

2. The process of claim 1, in which the dihydric alcohol is ethylene glycol.

3. The process of claim 1, in which the material is an ester of the dimeric, dibasic fat acids, and the reaction is conducted in the presence of a glycolysis catalyst.

4. The process of claim 1, in which the reaction is thermally conducted in an inert atmosphere.

5. A process of forming an essentially linear superpolyester containing non-benzenoid unsaturation, comprising reacting an excess of ethylene glycol with a dimeric, dibasic fat acid derived from a heat-bodied vegetable oil containing acids having a plurality of double bonds to form an alpha-polyester, and reacting the alpha-polyester with ethylene glycol in the presence of a glycolysis catalyst to form the superpolyester.

6. A process of forming an essentially linear superpolyester containing non-benzenoid unsaturation, comprising heating a mixture of a glycolysis catalyst, an excess of ethylene glycol and a dimeric, dibasic fat acid derived from heat-bodied vegetable oils containing acids having a plurality of double bonds at a temperature of about 170°–180° C. for about 8–10 hours, and then heating at a temperature of about 195° C. for about 17 days.

JOHN C. COWAN.
DONALD H. WHEELER.

REFERENCES CITED

The following references are of record in the file of this patent:

UNITED STATES PATENTS

| Number | Name | Date |
|---|---|---|
| 2,111,427 | Kittridge | Mar. 15, 1938 |
| 2,325,040 | Cook | July 27, 1943 |
| 2,347,562 | Johnston | Apr. 25, 1944 |

FOREIGN PATENTS

| Number | Country | Date |
|---|---|---|
| 428,864 | Great Britain | May 15, 1935 |

OTHER REFERENCES

Ind. & Eng. Chem. 29, 579–584 (1937).
Ind. & Eng. Chem. 33, 86–89 (1941).